R. P. JACKSON.
MEANS FOR PROTECTING TRANSMISSION LINES.
APPLICATION FILED JUNE 19, 1915.

1,368,339.                                    Patented Feb. 15, 1921.

WITNESSES:

INVENTOR
Ray. P. Jackson.
BY
ATTORNEY

UNITED STATES PATENT OFFICE.

RAY P. JACKSON, OF EDGEWOOD PARK, PENNSYLVANIA, ASSIGNOR TO WESTING-HOUSE ELECTRIC AND MANUFACTURING COMPANY, A CORPORATION OF PENNSYLVANIA.

MEANS FOR PROTECTING TRANSMISSION-LINES.

1,368,339.　　　Specification of Letters Patent.　　Patented Feb. 15, 1921.

Application filed June 19, 1915. Serial No. 35,145.

*To all whom it may concern:*

Be it known that I, RAY P. JACKSON, a citizen of the United States, and a resident of Edgewood Park, in the county of Allegheny and State of Pennsylvania, have invented a new and useful Improvement in Means for Protecting Transmission-Lines, of which the following is a specification.

My invention relates to systems of electrical distribution, and has special reference to transmission lines which possess high capacity reactance, such as obtains in those which extend over long distances and operate at high voltages.

More particularly, my invention relates to a protective device for a transmission line of the above-mentioned character by means of which abnormal potentials, resulting from the capacity reactance of the line, may be substanially precluded from forming.

It is well known that, in long transmission lines which are insulated to operate at very high voltages, the compacity reactances inherent in such lines may subject them to abnormally high potentials when certain conditions obtain. For instance, when a very long transmission line furnishes power to distributing circuits which are connected to the load end of the line, abnormally high potentials may be established at the load-end of the line when the power required by the distributing circuits is substantially decreased below the normal demand. Moreover, the forming of these abnormally high potentials is greatly aggravated when all of the load is disconnected from the line. Under these circumstances, destructive potentials may be established which frequently result in destroying the insulators adjacent to the open end of the line. Such potential disturbances arise from the capacitance or the capacity reactance inherent in the line and distributed substantially uniformly throughout its entire length.

An object of my invention is to provide means whereby abnormally high potentials are substantially precluded from forming at the load-end of a transmission line when the load supplied therefrom is substantially decreased or entirely disconnected from circuit.

Figure 1:
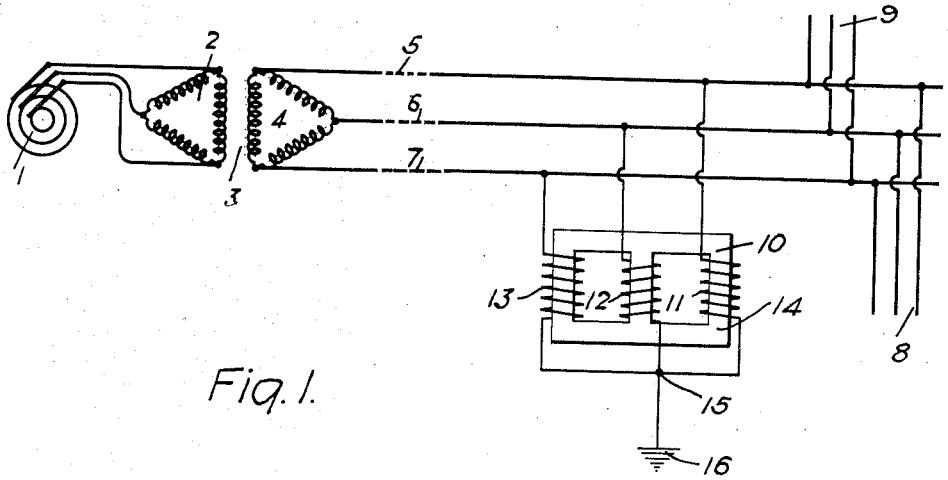
Figure 2:
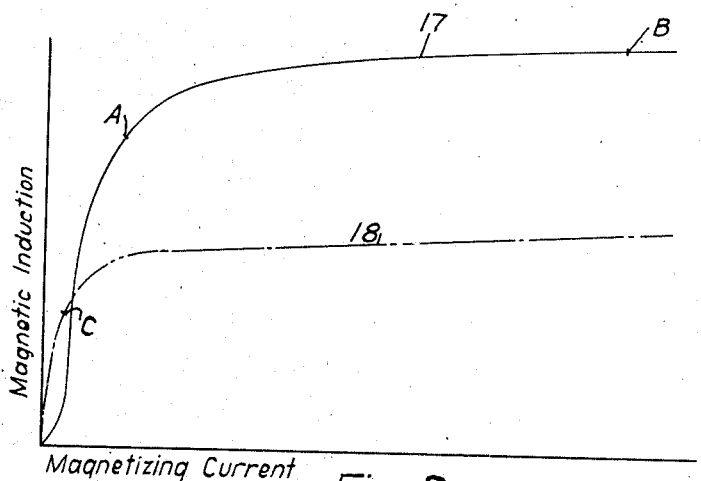

To more fully understand the characteristic features of my invention, reference may be had to the following description and the accompanying drawing in which Figure 1 is a diagrammatic view illustrating an embodiment of my invention, and Fig. 2 is a graph showing several magnetization curves of inductive material which I utilize in my protective device.

In Fig. 1, a source of current supply, shown as a three-phase alternator 1, is connected to a low-tension winding 2 of a high-voltage power transformer 3. A high-tension winding 4, inductively related to the low-tension winding 2, supplies power to a transmission line, comprising conductors 5, 6 and 7 which may extend a long distance. Distributing circuits, such as are indicated at 8 and 9, are connected to the load-end of the transmission line in order to furnish power to translating devices, such as power apparatus, railway systems, etc. In proximity to where the power circuits 8 and 9 are connected to the transmission line, I provide an inductive device 10 comprising windings 11, 12 and 13 which embrace a magnetizable core member 14. The proper terminals of the windings 11, 12 and 13 are connected, respectively, to the transmission line conductors 5, 6 and 7, and the other terminals thereof are connected to a neutral point 15 which, in turn, is grounded at 16. It will be understood that the transmission line extending between the source of current supply 1 and the point of application of the inductive device 10 has a substantially high capacity reactance of a value common in many of the modern high-voltage transmission lines.

As above mentioned, abnormally high potentials may be established at the load-end of the transmission line when the load supplied therefrom is substantially decreased or entirely disconnected from circuit by reason of the high capacitance of the transmission line. To preclude the formation of these abnormally high and usually destructive potentials, I connect in circuit, as hereinbefore described, the inductive device 10. The magnetizable core member 14 of the inductive device 10 is so proportioned and designed that, when normal operating potentials obtain upon the transmission line, the magnetizing currents flowing through the windings 11, 12 and 13 will be relatively low in value.

For instance, reference may be had to Fig. 2 in which a magnetization curve 17 is plotted to represent the magnetization characteristic of suitable material comprising the core member 14. When the potentials impressed across the inductive windings 11, 12 and 13 are of normal value, it is intended that the magnetic induction of the core member 14 will approximately correspond to that indicated by the point A on the curve 17. It will be noted, in this instance, that the magnetizing currents required for magnetizing the core 14 to a degree corresponding to the point A, or in the lower region of the knee of the magnetization curve 17, will be substantially low in value. These low-valued currents will not seriously impair the operation of the transmission line or increase, to a serious degree, the line-drop.

When the distributing circuits 8 and 9 are disconnected from the transmission line, the capacity reactance inherent in the line will tend to establish abnormally high potentials at the load-end thereof. As a result, the electromotive forces impressed on the inductive windings 11, 12 and 13 will be substantially increased in value. This increase in the potential impressed across the windings will result in a greatly increased flow of current, and the cores within the windings will soon be fully saturated. From the graph, it will be apparent that the currents which flow will be highly inductive in character, since they are purely magnetizing, and, moreover, since the iron has become fully saturated. The point indicated at B, indicates the value to which the magnetizing current must rise to give only a slight increase in the flux linkage after the knee of the curve has been past. Since these highly inductive currents are drawn from the line conductors 5, 6 and 7, a highly inductive component current will flow in the distribution system, and, as a result thereof, the drop caused by these highly inductive currents will be lagging in character, and will tend to neutralize, to a large extent, the capacity voltage which tends to exist at the end of the line when the load is removed therefrom.

The curve 17 of Fig. 2 represents approximately the magnetization characteristic of a sample of iron. If it is desired to employ materials having other characteristics, the effectiveness of the device 10 will not be impaired if properly designed. For instance, a curve 18 represents a magnetization curve of a nickel-iron alloy containing about 35 per cent. of nickel. When the core 14 is made from this alloy, it will be noted that the magnetizing currents required to magnetize the core member will be very small in value, such as indicated at C in the region of the knee of curve 18. At the same time, the curve 18 is very flat, thereby indicating that very large magnetizing and lagging currents may traverse the windings 11, 12 and 13 of the inductive device 10 when abnormally high potentials tend to develop at the end of the line.

From the foregoing description, it will be apparent that the potentials obtaining at the load end of a long transmission line may be maintained within safe limits when all the load is disconnected therefrom by employing the herein disclosed protective device. While I have shown the device 10 as being connected through its neutral point 15 to the ground 16, the same will operate in a satisfactory manner without a ground connection. Although the core member 14 is described as formed of iron or a nickel-iron alloy, other materials may be found suitable for accomplishing the above-mentioned objects.

While the device shown and described is associated with a three-phase transmission system, it will be apparent to those skilled in the art that any alternating-current transmission system may be protected in a similar manner, and I desire my invention, therefore, to be limited only by the extent and scope of the appended claims.

I claim as my invention:

1. The combination with a high capacitance transmission line and a source of alternating current supply connected to one end thereof, of an inductive reactance device comprising a magnetizable core member and a winding disposed thereupon and connected in shunt to the conductors of the transmission line at a point removed from said supply end, the core member of said inductive device being magnetized to a degree just below the knee of the magnetization curve when normal operating potentials obtain upon the transmission line, and said core member becoming substantially magnetically saturated when potentials above normal obtain on the transmission line in order to effect the flow over said transmission line of high magnetizing currents.

2. The combination with a high capacitance transmission line and a source of alternating currents connected to one end thereof, of an inductive reactance device comprising a magnetizable core member and a winding disposed at the load-end of said line, said core member being saturated to such a degree, when normal operating potentials obtain on said transmission line, that the exciting currents required thereby are relatively low in value, and when abnormally high potentials obtain on said transmission line, that the exciting currents required thereby are relatively high in value.

In testimony whereof, I have hereunto subscribed my name this 12th day of June, 1915.

RAY P. JACKSON.